United States Patent
Yamada et al.

(10) Patent No.: US 8,406,972 B2
(45) Date of Patent: Mar. 26, 2013

(54) DEVICE AND METHOD FOR CONTROLLING AUTOMATIC TRANSMISSION

(75) Inventors: Naohiro Yamada, Atsugi (JP); Tsukasa Hayashi, Isehara (JP)

(73) Assignee: Jatco Ltd, Fuji-shi (JP)

( * ) Notice: Subject to any disclaimer, the term of this patent is extended or adjusted under 35 U.S.C. 154(b) by 219 days.

(21) Appl. No.: 12/865,158

(22) PCT Filed: Jan. 26, 2009

(86) PCT No.: PCT/JP2009/051175
§ 371 (c)(1),
(2), (4) Date: Jul. 29, 2010

(87) PCT Pub. No.: WO2009/110261
PCT Pub. Date: Sep. 11, 2009

(65) Prior Publication Data
US 2011/0004381 A1    Jan. 6, 2011

(30) Foreign Application Priority Data
Mar. 6, 2008    (JP) .................... 2008-056069

(51) Int. Cl.
G06F 7/00    (2006.01)
G06F 17/00    (2006.01)
G06F 19/00    (2011.01)
H02P 17/00    (2006.01)
B60W 10/04    (2006.01)
B60W 10/10    (2012.01)

(52) U.S. Cl. ................. 701/55; 477/15; 477/34
(58) Field of Classification Search ........... 701/51, 701/53, 55, 56, 60, 64, 66, 71, 74, 75, 79, 701/85, 87, 93, 94, 95, 110, 111, 121, 124; 477/15–17, 20, 21, 27, 30, 31, 35, 36, 37–43, 477/46, 49, 55, 64, 68, 75, 77, 80, 115, 120, 477/123, 132, 133, 135, 139, 140, 34
See application file for complete search history.

(56) References Cited

U.S. PATENT DOCUMENTS

| | | | |
|---|---|---|---|
| 4,582,182 A * | 4/1986 | Takeda et al. | 192/3.31 |
| 4,852,006 A | 7/1989 | Speranza | |
| 5,079,972 A | 1/1992 | Iizuka | |
| 5,270,628 A * | 12/1993 | Noguchi et al. | 318/587 |

(Continued)

FOREIGN PATENT DOCUMENTS

| | | |
|---|---|---|
| DE | 103 30 155 A1 | 1/2005 |
| EP | 1 420 194 A2 | 5/2004 |

(Continued)

OTHER PUBLICATIONS

U.S. Appl. No. 12/865,160, filed Jul. 29, 2010, Yamada et al.

(Continued)

*Primary Examiner* — Khoi Tran
*Assistant Examiner* — Abby Lin
(74) *Attorney, Agent, or Firm* — Foley & Lardner LLP (57) ABSTRACT

When a read-ahead vehicle speed is calculated using an integrator and a delay element, a predetermined gain used for an integral calculation is made small if a result of the integral calculation greater than a predetermined value based on an actual vehicle speed.

3 Claims, 4 Drawing Sheets

U.S. PATENT DOCUMENTS

| | | | |
|---|---|---|---|
| 5,628,705 A | 5/1997 | Kashiwabara | |
| 5,695,428 A | 12/1997 | Yuasa et al. | |
| 5,762,581 A | 6/1998 | Kozaki et al. | |
| 5,857,937 A | 1/1999 | Ashizawa et al. | |
| 5,959,572 A * | 9/1999 | Higashimata et al. | 342/70 |
| 6,044,321 A * | 3/2000 | Nakamura et al. | 701/96 |
| 6,085,140 A | 7/2000 | Choi | |
| 6,157,884 A * | 12/2000 | Narita et al. | 701/51 |
| 6,188,943 B1 | 2/2001 | Uchida et al. | |
| 6,370,468 B1 | 4/2002 | Koga et al. | |
| 6,574,535 B1 * | 6/2003 | Morris et al. | 701/22 |
| 7,338,406 B2 * | 3/2008 | Shimoda | 477/46 |
| 8,002,654 B2 * | 8/2011 | Oshiumi et al. | 474/28 |
| 8,112,204 B2 | 2/2012 | Yamada et al. | |
| 2001/0020789 A1 * | 9/2001 | Nakashima | 290/40 C |
| 2004/0097328 A1 | 5/2004 | Makiyama et al. | |
| 2005/0192133 A1 * | 9/2005 | Oshiumi et al. | 474/18 |
| 2006/0231310 A1 * | 10/2006 | Suzuki et al. | 180/197 |
| 2007/0100535 A1 * | 5/2007 | Yasui et al. | 701/103 |
| 2008/0189021 A1 * | 8/2008 | Inoue et al. | 701/93 |
| 2009/0248233 A1 * | 10/2009 | Yamada et al. | 701/29 |
| 2010/0332092 A1 * | 12/2010 | Yamada et al. | 701/58 |
| 2011/0054751 A1 * | 3/2011 | Yamada | 701/60 |
| 2011/0054755 A1 * | 3/2011 | Yamada | 701/68 |

FOREIGN PATENT DOCUMENTS

| | | |
|---|---|---|
| JP | 03-103661 A | 4/1991 |
| JP | 05-010434 A | 1/1993 |
| JP | 07-248057 A | 9/1995 |
| JP | 08-320066 A | 12/1996 |
| JP | 09-210159 A | 8/1997 |
| JP | 2000-009222 A | 1/2000 |
| JP | 2001-324004 A | 11/2001 |
| JP | 2002-168339 A | 6/2002 |
| JP | 2003-254426 A | 9/2003 |

OTHER PUBLICATIONS

N. Yamada, U.S. PTO Notice of Allowance, U.S. Appl. No. 12/865,160, dated Jul. 30, 2012, 9 pages.

N. Yamada, U.S. PTO Office Action, U.S. Appl. No. 12/865,160, dated Mar. 28, 2012, 16 pages.

* cited by examiner

VSP: ACTUAL VEHICLE SPEED
VSP∗: FUTURE VEHICLE SPEED
V: INTEGRAL CALCULATION VALUE
VSP2: ESTIMATED VEHICLE SPEED 2

DEVICE AND METHOD FOR CONTROLLING AUTOMATIC TRANSMISSION

TECHNICAL FIELD

The present invention relates to device and method for controlling an automatic transmission which perform a control of a gear shift ratio based on an estimated value of a vehicle speed after a predetermined time.

BACKGROUND OF THE INVENTION

A technique described in a Japanese Patent Application Publication No. Heisei 9-21059 (this corresponds to a U.S. Pat. No. 5,857,937) and which uses a gear shift control using an estimated vehicle speed after a predetermined time is known, with an aim to prevent an occurrence of an engine racing or so forth at a time of a gear shift control due to a delay in a mechanical component during the gear shift control. In this publication, in order to eliminate an influence of noise in a case where a vehicle speed differential value is merely used, vehicle speed estimating means is constituted by an integrator and a predetermined delay element. Specifically, a delay element is acted upon an estimated vehicle speed 2 estimated on a basis of an integral calculation value to calculate an estimated vehicle speed 1 and the integral calculation value is calculated by performing an integral calculation for a deviation between an actual vehicle speed and estimated vehicle speed 1.

DISCLOSURE OF THE INVENTION

In the structure of the above-described prior art, for example, when a vehicle driver largely depresses an accelerator pedal with a wide angle during a constant speed traveling, the actual vehicle speed is, at first, raised and the estimated vehicle speed 2 is calculated on a basis of the integral calculation value developed along with the rise in the actual vehicle speed. At this time, after the estimated vehicle speed is calculated to be a lower value than the actual vehicle speed, a result of the integral calculation is progressively accumulated so that estimated vehicle speed 2 catches up to the actual vehicle speed and, thereafter, estimated vehicle speed 2 after the predetermined time is estimated with high accuracy. Thus, it is necessary to set largely a gain used for the integral calculation in order for the result of calculation of estimated vehicle speed 2 to be followed quickly.

It was, however, determined that, if this gain were set to a large value, a large overshooting would be repeated until estimated vehicle speed 2 was converged into a highly accurate state.

It is an object of the present invention to provide a device and method for controlling an automatic transmission which are capable of quickly converging an estimated vehicle speed 2 into a highly accurate state while an estimation response characteristic for the estimated vehicle speed 2 is secured.

In order to achieve the above-described object, according to the present invention, a predetermined gain used for the integral calculation is set to a small value when a result of the integral calculation is in excess of a predetermined value based on the actual vehicle speed.

Specifically, in the invention described in claim 1, there is provided a control device for an automatic transmission in which a speed ratio between an input shaft connected to an engine side of a vehicle and an output shaft connected to a driving system of the vehicle is modified, the control device comprising: vehicle speed detecting means for detecting an actual vehicle speed that is a traveling speed of the vehicle; vehicle speed estimating means for calculating an estimated vehicle speed 2 (VSP2) that is a target future vehicle speed at a predetermined time based on the actual vehicle speed and an acceleration component speed; target gear shift ratio calculating means for calculating a target gear shift ratio based on predetermined driving state signals including the VSP2; and gear shift control means for controlling the automatic transmission based on the target gear shift ratio, wherein the vehicle speed estimating means comprises: a vehicle speed deviation calculation section configured to calculate a vehicle speed deviation between the actual vehicle speed and an estimated vehicle speed 1 (VSP1); an estimated vehicle speed 2 calculation section configured to calculate the VSP2 based on a result of integral calculation of an integration for the vehicle speed deviation with a predetermined gain; an estimated vehicle speed 1 calculation section configured to calculate the VSP1 by means of a delay element performing a predetermined delay operation the VSP2; and a gain modification section configured to make the predetermined gain small when the result of integral calculation is greater than a predetermined value based on the actual vehicle speed, the gain modification section being operated only when an accelerator pedal opening angle is larger than a predetermined value of the accelerator pedal opening angle.

In addition, in the invention described in claim 2, there is provided a control device for an automatic transmission, the automatic transmission being configured to modify a speed ratio between an input shaft connected to an engine side of a vehicle and an output shaft connected to a driving system of the vehicle, the control device comprising: a vehicle speed detection section configured to detect an actual vehicle speed that is a traveling speed of the vehicle; and a controller, the controller being configured: to calculate an estimated vehicle speed 2 (VSP2) that is a target future vehicle speed at a predetermined time based on the actual vehicle speed and an acceleration component speed, to calculate a target gear shift ratio based on predetermined driving state signals including the VSP2, and to control the automatic transmission based on the target gear shift ratio, to calculate a vehicle speed deviation between the actual vehicle speed and an estimated vehicle speed 1 (VSP1) when calculating the VSP2, to estimate the VSP2 based on a result of integral calculation of an integration for the vehicle speed deviation with a predetermined gain, to calculate the VSP1 by a delay element performing a predetermined delay operation based on the VSP2, and to make the predetermined gain small when the result of integral calculation is greater than a predetermined value based on the actual vehicle speed, and wherein the controller modifies the predetermined gain in order to make the predetermined gain small only when an accelerator opening angle is larger than a predetermined value of the accelerator pedal opening angle.

It should herein be noted that estimated vehicle speed 2 is a value calculated only if a deviation between the actual vehicle speed and estimated vehicle speed 1 occurs. For example, at a time of an acceleration from the constant speed traveling state, during a transition to a state in which the accuracy of estimated vehicle speed 2 is high, estimated vehicle speed 2 is transferred from a small state to a large state with respect to the actual vehicle speed and, thereafter, is transferred to a state near to the vehicle speed (hereinafter, a future vehicle speed) after an actual predetermined time. In other words, when the result of integral calculation comes near to the actual vehicle speed, estimated vehicle speed 2 is made in a state where estimated vehicle speed 2 comes near to a future vehicle speed. According to this result, the predetermined gain is set to be large value until the result of integral calculation comes near to the actual vehicle speed and the response characteristic is secured until estimated vehicle speed 2 comes near to the future vehicle speed. On the other hand, the predetermined gain is set to be small after estimated vehicle speed 2 comes near to the future vehicle speed so that a quick convergence to the future vehicle speed can be achieved while an excessive overshooting is avoided.

BEST MODE FOR CARRYING OUT THE INVENTION

Hereinafter, a best mode achieving a control device for an automatic transmission according to the present invention will be described on a basis of a first preferred embodiment shown in the drawings.

First Embodiment

Figure 1:
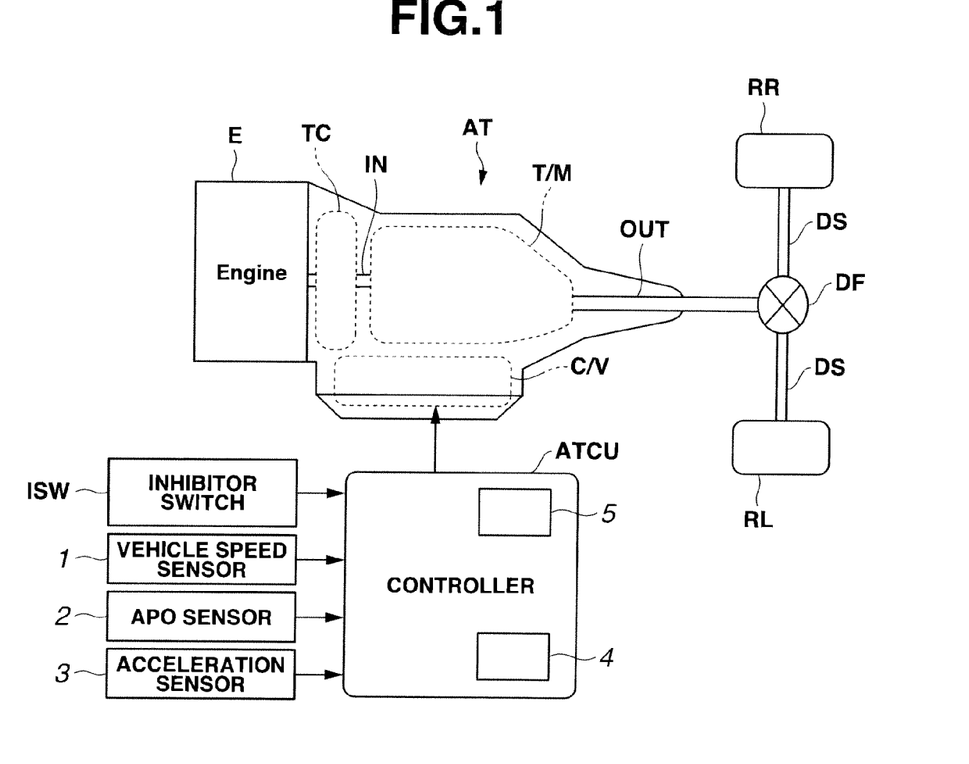
FIG. 1 is a whole system configuration view of a vehicle in which a control device for an automatic transmission in a first preferred embodiment is equipped.

First, a structure will be described. FIG. 1 shows a whole system configuration of a vehicle in which the control device for the automatic transmission in the first embodiment is equipped. The vehicle in the first embodiment is exemplified by a rear-wheel drive vehicle but the vehicle may be a front-wheel drive vehicle or a four-wheel drive vehicle.

The vehicle in the first embodiment includes an engine E, a torque converter TC, and an automatic transmission AT (or T/M). A driving force outputted from engine E is transmitted to an input shaft IN of automatic transmission AT via torque converter TC. A plurality of planetary gear sets and a plurality of clutching elements are provided within automatic transmission AT. The driving force gear-shifted by means of a gear shift stage determined from a combination of these clutching elements is transmitted from an output shaft OUT to a differential DF. The driving force in differential DF is transmitted from a drive shaft of rear left and right road wheels RR, RL.

Automatic transmission AT is structured to enable a setting of a gear shift ratio according to a traveling state and to increase or decrease a number of revolutions per unit time of the input shaft IN to be outputted to the output shaft OUT. As automatic transmission AT in the first embodiment, a geared automatic transmission of forward five speeds and a reverse first speed is mounted in the vehicle.

A plurality of clutching elements, a one-way clutch, and an oil pump are built in this automatic transmission AT. A clutching pressure regulated within a control valve C/V is supplied to each of the clutching elements. The gear ratio of the planetary gear sets is determined according to the combination of the clutching elements to achieve a desired shift stage.

In addition, at a time of the gear shift, a, so-called, replacement gear shift control in which a release side clutching element is progressively released which is the clutching element achieving the gear shift stage before the gear shift and a clutch side clutching element is progressively clutched which is the clutching element achieving the gear shift stage after the gear shift is carried out to perform the gear shift.

An automatic transmission controller ATCU determines a gear shift stage of automatic transmission AT on a basis of various kinds of input information and outputs a control command signal to an actuator to achieve each of the gear shift stages (or gear shift ratios). In addition, automatic transmission controller ATCU includes: a vehicle speed estimation section 4 estimating a read-ahead vehicle speed VSP2 which is a future vehicle speed by a predetermined time; and a gear shift control section 5 which controls a clutch-and-release state of the clutching elements on a basis of various kinds of input information.

Automatic transmission controller ATCU inputs a range position signal of an inhibitor switch ISW representing a position of a shift lever selected by the driver, the actual vehicle speed from vehicle speed sensor 1, an accelerator opening angle signal from an APO sensor 2 detecting an accelerator pedal opening angle APO operated by the driver, and an acceleration signal from acceleration sensor 3 detecting an acceleration of the vehicle.

It should herein be noted that inhibitor switch ISW outputs a signal representing one of forward traveling range positions (D, L, 1, 2, and so forth), a reverse traveling range position (R), a neutral range position (N), and a parking range position (P). In the first embodiment, the traveling range includes both ranges of the forward traveling range and the reverse traveling range.

Figure 2:
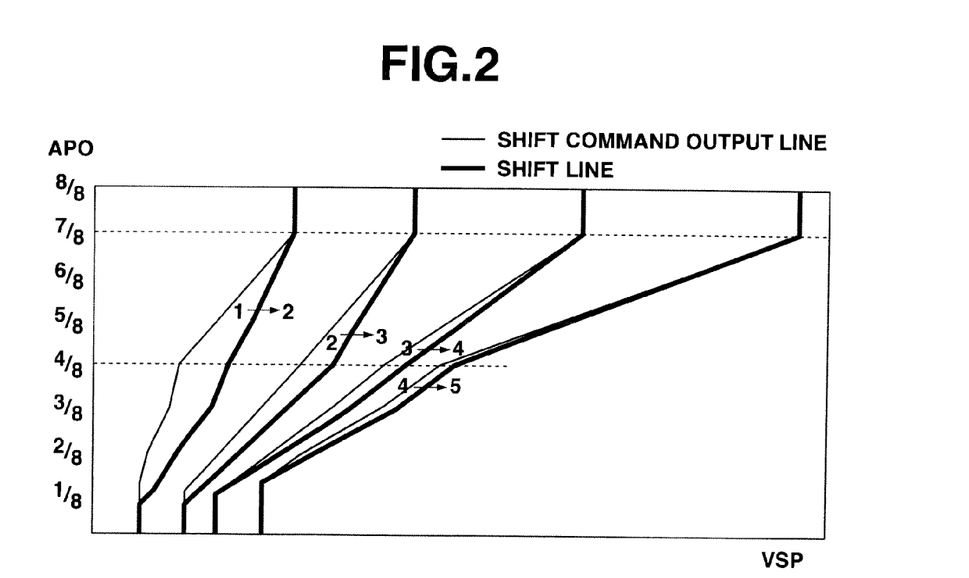
FIG. 2 is a shift map set within a gear shift control section in the first embodiment.

FIG. 2 shows a shift map set within gear shift control section 5. In this shift map, a lateral axis denotes vehicle speed VSP and a longitudinal axis denotes accelerator pedal opening angle APO. It should herein be noted that a point determined according to a vehicle speed and accelerator opening angle described as a driving point is described as a driving point. The driving point causes the gear shift stage in accordance with a region set within the shift map to be selected.

From the shift map in FIG. 2, bold solid lines denote ideal shift lines, each ideal shift line representing an ideal timing at which the gear shift is actually performed. In addition, fine solid lines set at a left side of each of the bold solid lines in FIG. 2 is a shift line outputting a gear shift command to finish the actual gear shift on the ideal gear shift line. The driving point is moved according to an increase or decrease of vehicle speed VSP and the increase or decrease of accelerator pedal opening angle APO. For example, when accelerator pedal opening angle APO is ⅜, the driving point crosses 1→2 shift line along with a rise in the vehicle speed and, when the driving point is moved from a region of a first speed to a region of a second speed, an up-shift occurs. Then, the gear shift is finished on 1→2 ideal shift line. It should be noted that, although, actually, a down-shift line, a coast travel control line, a slip lock-up control line, and so forth are set in the shift map but the detailed description thereof will herein be omitted.

The shift map is divided into three regions along accelerator pedal opening angle APO axis. Opening angle of ⅛ through ⅘ is an ordinary control region in which the gear shift control is carried out using directly the actual vehicle speed detected by vehicle speed sensor 1. During the opening angle ranging from 7/8 to 8/8, the gear shift control using the read-ahead vehicle speed as will be described later is carried out. During opening angle of 4/8 through 7/8, a weighting control region is provided in which the gear shift control is carried out using a weighted vehicle speed to which the weight is applied to the read-ahead vehicle speed and the actual vehicle speed.

In the ordinary control region, the gear shift command is output when the actual vehicle speed crosses the shift line. At this time, the gear shift is finished at a timing at which the driving point reaches the gear shift line. It should be noted that, during accelerator pedal opening angle APO of 0 through 1/8, a slight delay occurs in a time duration from an issuance of the gear shift command to a gear shift completion so that the shift line and the ideal shift line are set to be placed at the same position.

In the weighted control region, the gear shift command is issued when the weighted vehicle speed crosses the gear shift line. The weighted vehicle speed is a value calculated by weighting read-ahead vehicle speed VSP2 and actual vehicle speed VSP in accordance with accelerator opening angle APO. Specifically, if weighted vehicle speed is assumed to be VSP0, VSP0 is calculated as follows: VSP0=VSP2{(APO−4/8)/(3/8)}+VSP{(7/8−APO)/(3/8)}. When this weighted vehicle speed VSP0 crosses the shift line, the gear shift command is outputted. Then, the gear shift is finished at a timing for the driving point to be reached to the gear shift line.

In the read-ahead control region, when the read-ahead vehicle speed crosses the ideal shift line, the gear shift command is outputted. At this time, the gear shift is finished at a timing at which the driving point has reached to the shift line.

[Relationship Between Gear Shift Line and Ideal Shift Line]

A relationship between the shift line and the ideal shift line will, hereinbelow, be described. As described above, automatic transmission AT carries out the gear shift operation according to engagement and release of the clutching elements. At this time, a release side clutching element is released and an engagement side clutching element is engaged.

A general gear shift operation is carried out by passing through a pre-charge phase during which a charge for a looseness in the engagement side clutching element is carried out, a torque phase during which an engagement pressure is supplied to the engagement side clutching element while the engagement pressure for the release side clutching element is slightly drawn out, an inertia phase during which, while the engagement pressure of the release side clutching element is decreased, the engagement pressure of the engagement side clutching element is increased to promote a variation in the gear ratio, and a gear shift completion phase during which the engagement pressure of the engagement side clutching element provides a complete engagement pressure according to a completion of the gear shift. Such a technique in a case where an input torque is large and it is difficult to promote an advance of the gear shift particularly at the inertia phase and so forth, and a gear shift speed is controlled according to an engine torque down control and so forth is known.

However, in general, there is a tendency for a gear shift time duration to become longer as an input torque becomes larger. In other words, a mechanical operation response characteristic and a delay element based on the input torque are present.

On the other hand, it is said that a correlation between a vehicle speed response range and a driveablity at each of the gear shift stages is present. Particularly, in order for the up-shift to become a rhythmical gear shift, it is desirable to complete the gear shift at a desired timing. A timing at which the gear shift is finished is the ideal shift line.

It should, herein, be noted that a fact that the gear shift is started from a time at which the driving point has reached to one ideal shift line causes a timing at which the gear shift is actually completed due to the delay element and so forth to become a timing different from the shift line (for example, high-vehicle speed side) so that a predetermined driveablity cannot be obtained. Therefore, the shift line is set and the timing at which the gear shift is actually finished and the driving point are made coincident with each other.

[Read-Ahead Vehicle Speed]

Next, the read-ahead vehicle speed will, herein, be described. The above-described shift line is, up to the most, prescribed by the driving point and it cannot be said that an influence due to the actual traveling environment is not given. For example, even if accelerator pedal opening angle APO is large, vehicle speed VSP is actually raised under a traveling environment at which a vehicle load is large and a time to cross the ideal shift line becomes long. On the other hand, under a traveling environment at which a vehicle load is small, a time it takes to cross the ideal shift line becomes short.

In this way, an appropriate setting of a timing in accordance with the traveling environment is required and this requirement is particularly required in a region in which accelerator pedal opening angle APO is so large that the gear shift time duration tends to be long.

Hence, a predetermined time future vehicle speed is estimated on a basis of the actual vehicle speed from actual vehicle speed sensor 1 and estimated vehicle speed is gear shift controlled as a read-ahead vehicle speed VSP2 (=estimated vehicle speed 2). Specifically, the gear shift command is output at a timing varied in accordance with the traveling environment when estimated read-ahead vehicle speed VSP2 crosses the ideal shift line. Then, the gear shift is finished at a timing at which the driving point in accordance with actual vehicle speed VSP has reached the ideal shift line after the predetermined time has elapsed.

Figure 3:
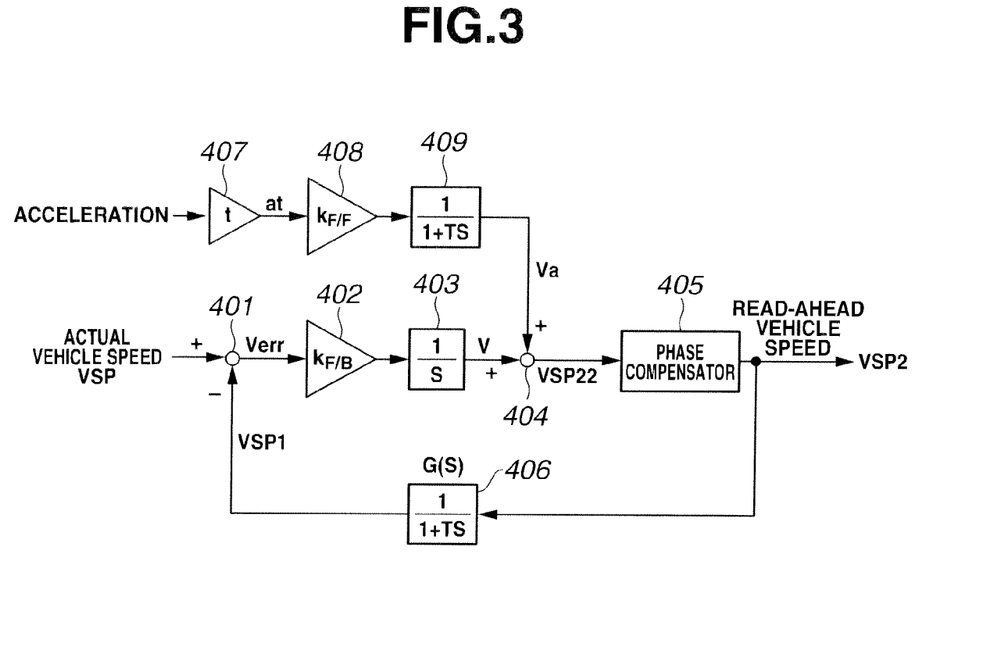
FIG. 3 is a control block diagram representing a read-ahead vehicle speed estimation processing in a vehicle speed estimation section in the first embodiment.

FIG. 3 shows a control block diagram representing a read-ahead vehicle speed estimation process at vehicle speed estimation section 4. Vehicle speed estimation section 4 is constituted by an integrator 40 and a first order delay 406. If an estimated vehicle speed VSP1 which is the present vehicle speed and actual vehicle speed VSP are coincident with each other, read-ahead vehicle speed VSP2 becomes the future vehicle speed by a time which accords with the delay element. Respective parts in the first embodiment will hereinafter be determined.

A vehicle speed deviation calculation section 401 calculates a vehicle speed deviation Verr from actual vehicle speed VSP and estimated vehicle speed VSP1 on a basis of the following equation.

$$Verr = VSP - VSP1 \qquad \text{(Equation 1)}$$

A feedback gain multiplication section 402 multiplies calculated vehicle speed deviation Verr by a feedback gain $k_{F/G}$.

An integrator 403 integrates $k_{F/B} \cdot Verr$ according to the following equation and calculates an integral calculation value V.

$$V = k_{F/B}(1/s), \qquad \text{(Equation 2)}$$

wherein s denotes a Laplace operator.

(Acceleration Component)

A predetermined time multiplication section 407 multiplies a time t after a predetermined time to be estimated by an acceleration detected by means of acceleration sensor 3 to calculate an acceleration component of at.

A feed-forward gain multiplication section 408 multiplies feed-forward gain $k_{F/F}$ by calculated acceleration component at.

A speed conversion section 409 acts on a first order element shown in the following equation at $k_{F/F}$ to calculate an acceleration component vehicle speed Va.

$$G(s)=1/(Ts+1), \quad \text{(Equation 3)}$$

wherein T denotes a time constant corresponding to a read-ahead time which is a target by a designer.

A vehicle speed addition section 404 calculates an addition of an integral calculation value V to an acceleration component vehicle speed Va on a basis of the following equation and calculates a phase compensation prior read-ahead vehicle speed VSP22.

$$VSP22 = V + Va \quad \text{(Equation 4)}$$

A phase compensator 405 carries out a first-order/first-order phase compensation Gh(s) shown in the following equation for phase compensation prior read-vehicle speed VSP22 to calculate a read-ahead to vehicle speed VSP2.

$$Gh(s)=(T2s+1)/(T1s+1), \quad \text{(Equation 5)}$$

wherein T1 and T2 denote phase compensation constants.

An introduction of this phase compensator 405 is can set three design elements of phase compensation constants T1 and T2 and feedback gain $k_{F/B}$ for three unknown numbers of a first-order delay pole, a natural frequency, and a damping factor, these representing a stability of a system and a response characteristic of the system. According to the above-described setting, a system that the designer has desired can be designed. It should be noted that since the details thereof are disclosed in the Japanese Patent Application Publication No. Heisei 9-210159 (this corresponds to the U.S. Pat. No. 5,857,937 as described above), the details thereof will herein be omitted.

First-order delay 406 inputs read-ahead vehicle speed VSP2 and calculates a first order delay G(s) as shown in the following equation.

$$G(s)=1/(Ts+1), \quad \text{(Equation 6)}$$

wherein T denotes a time constant corresponding to a read-ahead time VSP2.

In other words, the delay element modifies read-ahead vehicle speed VSP2 to return to a state before a predetermined time. Thus, the vehicle speed at the present time on a basis of read-ahead vehicle VSP2 is estimated (estimated vehicle speed VSP1). When this estimated vehicle speed VSP1 and actual vehicle speed VSP coincide with each other, the read-ahead vehicle speed VSP2 is correct. If these speeds do not coincide with each other, the read-ahead vehicle speed VSP2 is corrected in accordance with vehicle speed deviation Verr.

[Feedback Gain Setting Process]

Figure 4:
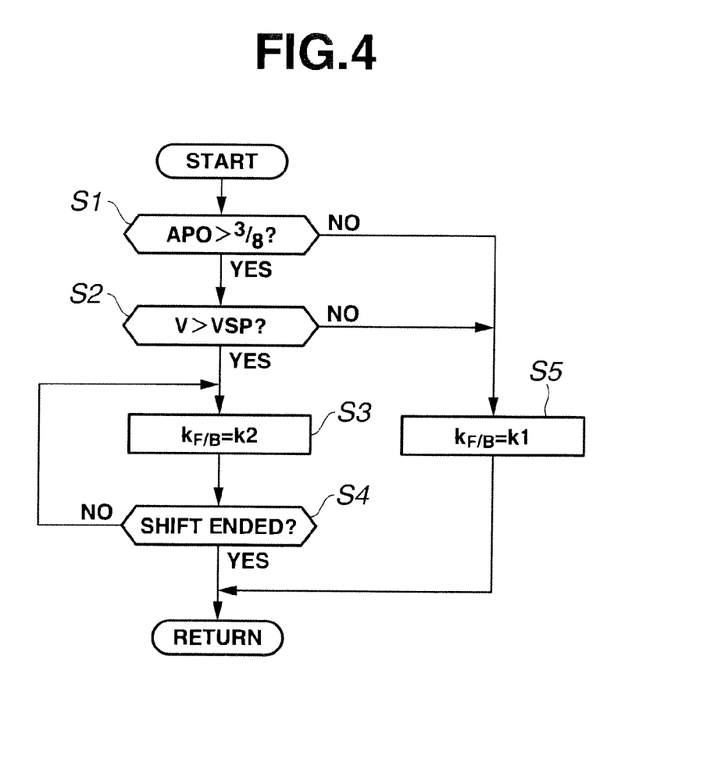
FIG. 4 is a flowchart representing a feedback gain setting process in the first embodiment.

Next, a feedback gain setting process will be described. FIG. 4 shows a flowchart representing a setting process of the feedback gain. The feedback gain setting process is a process that a feedback gain $k_{F/B}$ used in the above-described vehicle speed estimation section 4 is modified in accordance with a situation.

At a step S1, a determination is made of whether accelerator pedal opening angle APO is larger than ⅜. If accelerator pedal opening angle APO is determined to be larger than ⅜, the routine goes to a step S2. Otherwise, the routine goes to a step S5.

At step S2, a determination is made of whether integral calculation value V is larger than actual vehicle speed VSP. If V>VSP, the routine goes to a step S3. If not, the routine goes to step S5.

At step S3, feedback gain $k_{F/B}$ is set to k2 (<k1). At a step S4, a determination is made as to whether the gear shift control has ended. Until the gear shift control has ended, the routine returns to step S3 so that k2 is maintained as the feedback gain. At the time of the gear shift end, the present control flow is terminated. It should herein be noted that the end of the gear shift control represents a time duration during which the gear shift is started when the read-ahead vehicle speed crosses the shift line in a state in which the gear shift is not carried out and its gear shift is terminated. At step S5, feedback gain $k_{F/B}$ is set to k1 (>k2).

Figure 5:
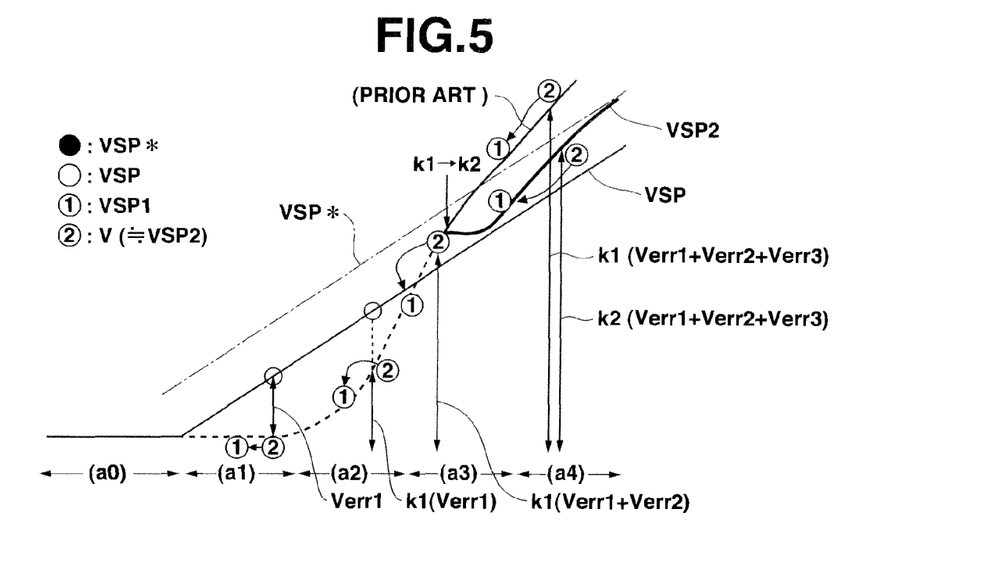
FIG. 5 is a rough view explaining a reason of modifying a feedback gain in the first embodiment.
Figure 6:
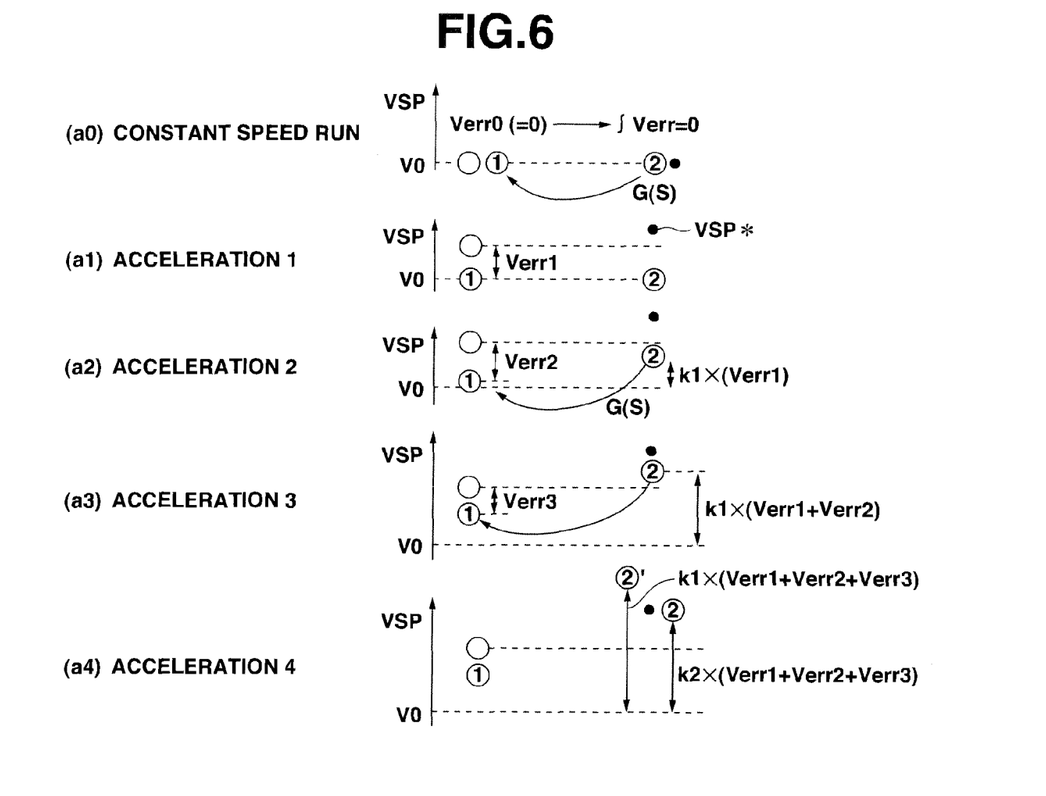
FIG. 6 is a view representing a relation from among actual vehicle speed VSP, estimated vehicle speed VSP1, a read-ahead vehicle speed VSP2, and a real future vehicle speed VSP* at each of the intervals of timing charts in FIG. 5.

FIG. 5 shows a rough view that explains a reason or modifying the feedback gain. FIG. 6 shows a relationship between actual vehicle speed VSP, estimated vehicle speed VSP1, read-ahead vehicle speed VSP2, and a real future vehicle speed VSP* at each of the intervals in the time chart of FIG. 5.

It should be noted that, in order to simplify the discussion, each interval is made coincide with a time width of a control period and an advance such as (a0)→(a1)→ is taken for each of the control periods (actually, the control period is about 10 msec.). As an action of integrator 403, in a digital arithmetic/logic operation unit, a vehicle speed deviation Verr at the present control period is added to vehicle speed deviation Verr at the previous control period to perform the integration. In addition, a value of addition of acceleration component vehicle speed Va to integral calculation value V passed through the phase compensator provides read-ahead vehicle speed VSP2 but, in this embodiment, with the acceleration set to be constant, the movements of read-ahead vehicle speed VSP2 and integral calculation value V are deemed to be approximately the same (actually, integral calculation value V becomes smaller than read-ahead vehicle speed VSP2).

At an interval of (a0), the vehicle is traveling at a constant vehicle speed V0. At this time, each of actual vehicle speed VSP, integral calculation value V (≈ read-ahead vehicle speed VSP2), estimated vehicle speed VSP1, and future vehicle speed VSP* coincide with V0 (refer to (a0) in FIG. 6).

At an interval of (a1), when the acceleration is started in response to the driver's depression on the accelerator pedal, at first, actual vehicle speed VSP is raised and accordingly future vehicle speed VSP* is raised. This rise in the future vehicle speed causes vehicle speed deviation Verr1 between estimated vehicle speed VSP1 and actual vehicle speed VSP to be developed.

At an interval of (a2), actual vehicle speed VSP is further raised and, accordingly, future vehicle speed VSP* is also raised. In addition, integral calculation value V (≈read-ahead vehicle speed VSP2) is outputted as a value which is a multiplication of feedback gain k1 by vehicle speed deviation Verr1 developed at the interval of (a1). Estimated vehicle speed VSP1 is raised on a basis of integral calculation value V (≈read-ahead vehicle speed VSP2). At this time, vehicle speed deviation Verr2 between estimated vehicle speed VSP1 and actual vehicle speed VSP is developed.

At an interval of (a3), to calculate k1 (Verr1+Verr2), vehicle speed deviation Verr2 calculated in interval of (a2) as integral calculation value V (≈read-ahead vehicle speed VSP2). Although this value is not yet reached to future vehicle speed VSP*, k1(Verr1+Verr2) is calculated as a large value. At this time, a difference between integral calculation value V (≈read-ahead vehicle speed VSP2) and the future vehicle speed becomes small as compared with that at interval (a2) (the accuracy becomes higher). At this time, vehicle speed deviation Verr3 between estimated vehicle speed VSP1 and actual vehicle speed VSP is generated.

At interval of (a4), if this control is continued without change, k1(Verr1+Verr2+Verr3) is calculated as integral calculation value V (≈ read-ahead vehicle VSP2) at the next control period. This value becomes larger than future vehicle speed VSP* and, thereby, an overshoot occurs (refer to ②' of (a4) in FIG. 6). Especially, in order to secure a following control at intervals (a1) through (a3), a large value is set to feedback gain k.

Read-ahead vehicle speed VSP2 is, originally, a value calculated to cross the ideal shift line at a desired timing. If this value overshoots, the ideal shift line is early crossed. In addition, since an acceleration force becomes insufficient so that a sufficient dynamic performance cannot be obtained.

Thus, if integral calculation value V (≈read-ahead vehicle speed VSP2) is in excess of actual vehicle speed VSP, feedback gain k1 is modified to become a small value of k2. Thus, integral calculation value V (≈read-ahead vehicle speed VSP2) indicates k2 (Verr1+Verr2+Verr3) (<k1(Verr1+Verr2+Verr3)) so that a quick convergence to future vehicle speed VSP* can be carried out.

That is to say, if, during the constant speed traveling, the driver largely depresses the accelerator pedal, at first, actual vehicle speed VSP is raised and read-ahead vehicle speed VSP2 is calculated on a basis of integral calculation value V developed accordingly. At this time, read-vehicle speed VSP2 is calculated to be lower than actual vehicle speed VSP and, thereafter, a result of integral calculation is progressively accumulated so that read-ahead vehicle speed VSP2 follows up actual vehicle speed VSP and, thereafter, read-ahead vehicle speed VSP2 after a predetermined time can be estimated with a high accuracy. The feedback gain needs to be set so that above-described integral calculation value V quickly becomes in excess of actual vehicle speed VSP and, if not so, a desired response characteristic cannot be secured.

With the above-described phenomenon taken into consideration, if the feedback gain can be switched to a small value at a timing at which a determination that the read-ahead vehicle speed becomes near to future vehicle speed VSP* can be made, a compatibility between the response characteristic and convergence characteristic should be established.

Thus, as a result of verification of a phenomenon immediately before the follow-up to future vehicle speed VSP*, it was determined that, when integral calculation value V overtakes actual vehicle speed VSP, read-ahead vehicle speed VSP2 catches up to future vehicle speed VSP*. Thus, with a phenomenon that integral calculation value V overtakes actual vehicle speed VSP as a trigger, the feedback gain is switched to a small value, the compatibility between the response characteristic and the convergence characteristic being enabled to be established.

It should be noted that, according to the above-described logical structure, the modification of the feedback gain is carried out when phase compensation prior read-ahead vehicle speed VSP22 and read-ahead vehicle speed VSP2 become in excess of vehicle speed VSP. However, to phase compensation read-ahead vehicle speed VSP22 and to read-ahead vehicle speed VSP2, acceleration component vehicle speed Va is added which is an element having no relationship to the deviation between actual vehicle speed VSP and estimated vehicle speed VSP1. Integral calculation value V is used since each of these values of VSP22 and VSP2 provides a problem as an index of evaluation of the convergence characteristic.

In addition, the tendency of the above-described overshoot is developed at a time of acceleration. Hence, the feedback gain modification is executed only when accelerator pedal opening angle APO is larger than the predetermined value of ⅜. That is to say, when accelerator pedal opening angle APO is small, vehicle speed deviation Verr between actual vehicle speed VSP and estimated vehicle speed VSP1 is not so largely developed and, at this time, the overshoot is small.

Figure 7:
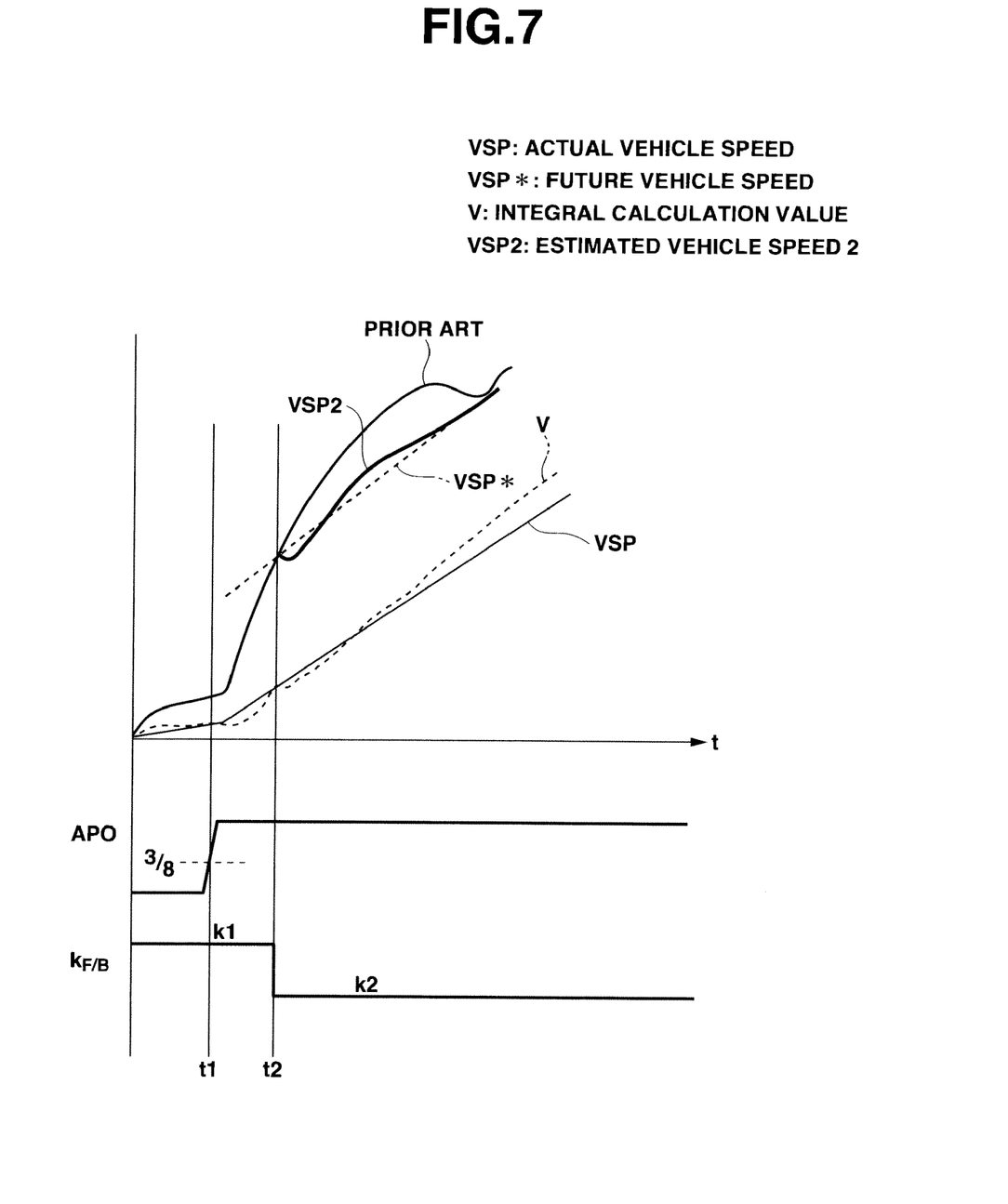
FIG. 7 is a timing chart when a feedback gain setting process in the first embodiment is carried out.

FIG. 7 shows a timing chart carrying out the feedback gain setting process. When the accelerator pedal is depressed, at a time point of t1, accelerator opening angle APO is in excess of ⅜. At this time, a read-ahead control process is started. It should be noted tat k1 is set as the present feedback gain. It should also be noted that, in the first embodiment, the gear shift control using read-ahead vehicle speed VSP2 is carried out in a region larger than ⅘ but the calculation of read-ahead vehicle speed VSP2 itself is started from a time at which accelerator pedal opening angle APO is ⅜.

If, at a time point t2, integral calculation value V is in excess of actual vehicle speed VSP, the feedback gain is switched from k1 to k2. At this time, since integral calculation value V is calculated as a small value, integral calculation value V is once reduced. However, until the gear shift control is ended, the feedback gain is maintained at k2.

As described above, in a case where the feedback gain is not switched from k1 to k2, read-ahead vehicle speed VSP2 as shown in a fine solid line of FIG. 7 is largely overshoot On the other hand, it is appreciated that, in the first embodiment, as shown in a bold solid line in FIG. 7, read-ahead vehicle speed VSP2 follows future vehicle speed VSP* with high accuracy.

As described above, the following action and advantages can be obtained in the first embodiment. (1) A control device for an automatic transmission AT in which a speed ratio between input shaft IN connected to engine side E of the vehicle and output shaft OUT connected to the driving system of the vehicle is modified, the control device comprising: vehicle speed sensor 1 as vehicle speed detecting means (the vehicle speed detecting section) for detecting actual vehicle speed VSP which is the traveling speed of the vehicle; vehicle speed estimation section 4 as vehicle speed estimating means for calculating read-ahead vehicle speed VSP2 (estimated vehicle speed 2) which is a target future vehicle speed by a predetermined time on a basis of actual vehicle speed VSP; the shift map as target gear shift ratio calculating means for calculating the target gear shift ratio on a basis of a predetermined driving state signal including read-ahead vehicle speed VSP2; and gear shift control section 5 as gear shift control means for controlling the automatic transmission on a basis of the target gear shift ratio, vehicle speed estimation section 4 includes vehicle speed deviation calculation section 401 configured to calculate deviation Verr between actual vehicle speed VSP and estimated vehicle speed VSP1 as will be described later; the calculation section (feedback gain multiplication section 402, integrator 403, vehicle speed adder 404, phase compensation section 403, and so forth) configured to estimate read-ahead vehicle speed VSP2 on a basis of a result of calculation of integration of vehicle speed deviation by a predetermined gain $k_{F/B}$; an estimated vehicle speed calculation section 406 configured to calculate estimated vehicle speed VSP1 by means of the delay element that carries out a predetermined delay operation on a basis of the read-ahead vehicle speed VSP2; and the gain modification section (a step S2) which makes small predetermined gain $k_{F/B}$ when integral calculation result V is in excess of a predetermined value to (actual vehicle speed VSP in the first embodiment) based on the actual vehicle speed.

That is to say, until integral calculation result V approaches actual vehicle speed VSP, predetermined gain $k_{F/B}$ is made large (=k1) so that the response characteristic can be secured until read-ahead vehicle speed VSP2 approaches future vehicle speed VSP*. On the other hand, after read-ahead vehicle speed VSP2 has approached future vehicle speed VSP*, predetermined gain $k_{F/B}$ is made small (=k2). While an excessive overshoot can be avoided, a quick convergence of read-ahead vehicle speed VSP2 to future vehicle speed VSP* can be achieved.

(2) The gain modification section is operated only when the accelerator pedal opening angle is equal to or larger than the predetermined value (step S1). Hence, the gain is modified only when the overshoot is excessive so that a control stability can be improved.

It should be noted that although, in the first embodiment, actual vehicle speed VSP is used as the predetermined value based on the actual vehicle speed and feedback gain $k_{F/B}$ is set on a basis of the relationship between integral calculation value V and actual vehicle speed VSP, for example, an addition value or subtraction value of actual vehicle speed VSP to the predetermined value may be compared and determined with integral calculation value V. For example, when accelerator pedal opening angle APO becomes large, the determination can be made that the overshoot is easy to occur. Hence, a value which is the subtraction of a predetermined value VSP from actual vehicle speed VSP may be compared with integral calculation value V.

In addition, in the first embodiment, feedback to gain $k_{F/B}$ is modified but the value added within integrator 403 may be reset or subtracted by the predetermined quantity. Thus, integral calculation value V may be set to a small value.

In addition, in the first embodiment, the acceleration component is added on a basis of the value of acceleration sensor 3. However, without addition of the acceleration component, the control may be carried out using the large feedback gain k1. In addition, although phase compensator 405 is used in the first embodiment, the structure without phase compensator may be accepted.

In addition, in a case where acceleration sensor 3 is not provided, the driving force is determined from the engine driving condition and the gear shift stage of the automatic transmission, a traveling resistance is calculated from the actual vehicle speed and so forth. Then, the vehicular acceleration may be calculated from these.

Next, other technical ideas will be described below. It should be noted that the action and advantages are the same as items (1) and (2).

(3) A control device for an automatic transmission, control device for an automatic transmission (AT), the automatic transmission being configured to modify a speed ratio between an input shaft (IN) connected to an engine side (E) of a vehicle and an output shaft (OUT) connected to a driving system of the vehicle, the control device comprising: a vehicle speed detection section (1) configured to detect an actual vehicle speed which is a traveling speed of the vehicle; and a controller, the controller being configured to calculate (4) an estimated vehicle speed 2 which is a target future vehicle speed by a predetermined time on a basis of the actual vehicle speed, to calculate (shift map) a target gear shift ratio on a basis of a predetermined driving state signal including the estimated vehicle speed 2, and to control the automatic transmission on a basis of the target gear shift ratio, and is wherein the controller is configured to calculate (401) a deviation (Verr) between the actual vehicle speed and the estimated vehicle speed 1 when calculating the estimated vehicle speed 2, to estimate (402, 403, 404, 405) the estimated vehicle speed 2 on a basis of a result of integral calculation of an integration for the vehicle speed deviation with a predetermined gain, to calculate (406) the estimated vehicle speed 1 by a delay element performing a predetermined delay operation on a basis of the estimated vehicle speed 2, and to make (step S2) the predetermined gain ($K_{F/B}$) small when the result of integral calculation is in excess of a predetermined value based on the actual vehicle speed.

(4) In the control device for the automatic transmission as set forth in item (3), the controller modifies the predetermined gain in order to make the predetermined gain small only when an accelerator opening angle is equal to or larger than a predetermined value thereof.

(5) A control method for an automatic transmission, the automatic transmission (AT) being configured to modify a speed ratio between an input shaft (IN) connected to an engine side (E) of a vehicle and an output shaft (OUT) connected to a driving system of the vehicle and the control method comprising: detecting (1) an actual vehicle speed which is a traveling speed of the vehicle; calculating (ATCU, 4) an estimated vehicle speed 2 which is a target future vehicle speed by a predetermined time on a basis of the actual vehicle speed; calculating (ATCU, shift map) a target gear shift ratio on a basis of a predetermined driving state signal including the estimated vehicle speed 2; and controlling (ATCU, 5) the automatic transmission on a basis of the target gear shift ratio and wherein, when the estimated vehicle speed 2 is calculated, a deviation (Verr) between the actual vehicle speed and the estimated vehicle speed 1 is calculated (ATCU, 401), the estimated vehicle speed 2 is estimated (ATCU, 402, 403, 404, 405) on a basis of a result of integral calculation of the integration for the vehicle speed deviation with a predetermined gain ($k_{F/B}$), the estimated vehicle speed 1 is calculated (ATCU, 406) by a delay element performing a predetermined delay operation on a basis of the estimated vehicle speed 2, and the predetermined gain is made small (ATCU, step S2) when the result of integral calculation is in excess of a predetermined value based on the actual vehicle speed.

(6) In the control method for the automatic transmission as set forth in item (5), the predetermined gain is made small only when an accelerator pedal opening angle is equal to or larger than a predetermined value thereof.

The invention claimed is:
1. A control device for an automatic transmission which modifies a speed ratio between an input shaft connected to an engine side of a vehicle and an output shaft connected to a driving system of the vehicle,
the control device comprising:
vehicle speed detecting means for detecting an actual vehicle speed that is a traveling speed of the vehicle;
vehicle speed estimating means for calculating an estimated vehicle speed 2 (VSP2) that is a target future vehicle speed at a predetermined time based on the actual vehicle speed and an acceleration component speed;
target gear shift ratio calculating means for calculating a target gear shift ratio based on a predetermined driving state signal including the VSP2; and
gear shift control means for controlling the automatic transmission based on the target gear shift ratio,
wherein the vehicle speed estimating means comprises:
a vehicle speed deviation calculation section configured to calculate a vehicle speed deviation between the actual vehicle speed and an estimated vehicle speed 1 (VSP1);
an estimated vehicle speed 2 calculation section configured to calculate the VSP2 based on a result of integral calculation of an integration for the vehicle speed deviation with a predetermined gain;
an estimated vehicle speed 1 calculation section configured to calculate the VSP1 by means of a delay element performing a predetermined delay operation based on the VSP2; and
a gain modification section configured to make the predetermined gain small when the result of integral calculation is greater than a first predetermined value based on the actual vehicle speed, the gain modification section being operated only when an accelerator pedal opening angle is larger than a second predetermined value of the accelerator pedal opening angle.

2. A control device for an automatic transmission,
the automatic transmission being configured to modify a speed ratio between an input shaft connected to an engine side of a vehicle and an output shaft connected to a driving system of the vehicle,
the control device comprising:
a vehicle speed detection section configured to detect an actual vehicle speed that is a traveling speed of the vehicle; and
a controller, the controller being configured:
to calculate an estimated vehicle speed 2 (VSP2) that is a target future vehicle speed at a predetermined time based on the actual vehicle speed and an acceleration component speed,
to calculate a target gear shift ratio based on a predetermined driving state signal including the VSP2,
to control the automatic transmission based on the target gear shift ratio,
to calculate a vehicle speed deviation between the actual vehicle speed and an estimated vehicle speed 1 VSP1 when calculating the VSP2,
to estimate the VSP2 based on a result of integral calculation of an integration for the vehicle speed deviation with a predetermined gain,
to calculate the VSP1 by a delay element performing a predetermined delay operation based on the VSP2, and
to make the predetermined gain small when the result of integral calculation is greater than a first predetermined value based on the actual vehicle speed, and
wherein the controller modifies the predetermined gain in order to make the predetermined gain small only when an accelerator opening angle is larger than a second predetermined value of the accelerator pedal opening angle.

3. A control method for an automatic transmission,
the automatic transmission being configured to modify a speed ratio between an input shaft connected to an engine side of a vehicle and an output shaft connected to a driving system of the vehicle,
the control method comprising:
detecting an actual vehicle speed that is a traveling speed of the vehicle, through vehicle speed detecting means;
calculating an estimated vehicle speed 2 (VSP2) that is a target future vehicle speed at a predetermined time based on the actual vehicle speed and an acceleration component speed with an electronic controller;
calculating a target gear shift ratio based on a predetermined driving state signal including the VSP2; and
controlling the automatic transmission based on the target gear shift ratio with the electronic controller, and
wherein, when the VSP2 is calculated, a vehicle speed deviation between the actual vehicle speed and an estimated vehicle speed 1 (VSP1) is calculated with the electronic controller, the VSP2 is estimated based on a result of integral calculation of an integration for the vehicle speed deviation with a predetermined gain through the electronic controller, the VSP1 is calculated by a delay element performing a predetermined delay operation based on the VSP2, and the predetermined gain is made small through the electronic controller when the result of integral calculation is greater than a first predetermined value based on the actual vehicle speed, and
wherein the predetermined gain is made small through the electronic controller only when an accelerator pedal opening angle is larger than a second predetermined value of the accelerator pedal opening angle.

\* \* \* \* \*